Jan. 13, 1925.  1,522,824

F. LJUNGSTRÖM ET AL

LOCOMOTIVE

Filed Sept. 24, 1923   7 Sheets-Sheet 1

Inventors
F. Ljungström
I. Broberg
E. O. Eriksson
By Marks & Clerk Attys.

Jan. 13, 1925.  1,522,824
F. LJUNGSTRÖM ET AL
LOCOMOTIVE
Filed Sept. 24, 1923  7 Sheets-Sheet 4

Inventors
F. Ljungström
I. Broberg
E. O. Eriksson
By Marks & Clerk Attys.

F. LJUNGSTRÖM ET AL 1,522,824

LOCOMOTIVE

Filed Sept. 24, 1923    7 Sheets-Sheet 6

F. LJUNGSTRÖM ET AL 1,522,824

LOCOMOTIVE

Filed Sept. 24, 1923 7 Sheets-Sheet 7

Inventors
F. Ljungström
I. Broberg
E. O. Eriksson
By Marks & Clerk Attys.

Patented Jan. 13, 1925.

1,522,824

UNITED STATES PATENT OFFICE.

FREDRIK LJUNGSTRÖM, OF LIDINGO-BREVIK, ISIDOR BROBERG, OF SKARSATRA, LIDINGON, AND ERIK OTTO ERIKSSON, OF LIDINGO-BREVIK, SWEDEN, ASSIGNORS TO AKTIEBOLAGET LJUNDSTRÖMS ANGTURBIN, OF STOCKHOLM, SWEDEN, A CORPORATION.

LOCOMOTIVE.

Application filed September 24, 1923. Serial No. 664,598.

*To all whom it may concern:*

Be it known that we, FREDRIK LJUNGSTRÖM, ISIDOR BROBERG, and ERIK OTTO ERIKSSON, subjects of the King of Sweden, residing at, respectively, Lidingo-Brevik, Sweden, Tallhyddan, Skarsatra, Lidingon, Sweden, and Ormbunken, Lidingo-Brevik, Sweden, have invented certain new and useful Improvements in Locomotives, of which the following is a specification.

In locomotives it has been previously proposed to arrange the driving means in such a manner with respect to the driving wheels as to facilitate gathering of the latter in one bogie. In such cases, the driving engine, consisting of a steam motor, was placed on the bogie and provided with a jointed or resilient steam conduit from the boiler or some kind of high pressure machinery. In ordinary locomotives having no condenser arrangements, the exhaust steam has been discharged directly into the surrounding atmosphere, while in cases where the locomotive is provided with a condenser, such exhaust steam is being utilized. Difficulties have then been met with in conducting the exhaust steam from the steam motor arranged on the bogie to the condenser through the comparatively large exhaust piping, the latter requiring a resilient joint or the like to meet the movements of the bogie. It has therefore been found to be the most advantageous to arrange this piping rigid, that is to say non-articulated, by rigidly connecting the driving set with the condenser. If the driving wheels are then gathered in one bogie, difficulties will be met with in transmitting the power from the steam motor, the position of which is fixed, to the driving wheels of the movable bogie, especially if the driving set comprises a steam turbine transmitting its driving power onto the driving wheels by means of a toothed gearing and a coupling rod arrangement.

The present invention aims at removing these difficulties, the same referring to an arrangement in locomotives provided with condensers and having the motion transmitted from a steam motor onto driving wheels gathered in one bogie by means of mechanical power transmission, the said arrangement consisting therein that the steam motor is rigidly connected with the condenser or with a vessel or frame pertaining thereto, while being movably connected with the bogie.

By an arrangement according to the invention it will be possible to mount the driving set on the vehicle in question, while maintaining the driving wheels gathered in one bogie, in a much more simple manner than if articulation or resiliency in the exhaust piping of the turbine had to be provided for, such latter arrangement involving heavy, unmanageable and unreliable constructions owing to the large dimensions of the said piping.

The invention is illustrated in the accompanying drawings.

Figure 1:
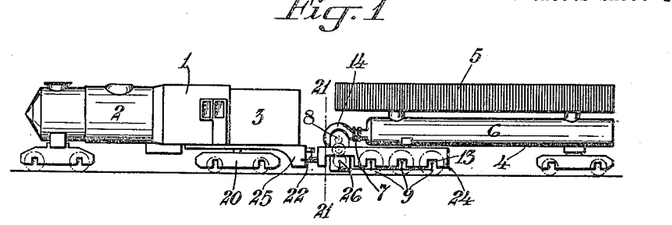
Fig. 1 is a lateral elevation of a locomotive in which the present invention may be suitably applied.
Figure 2:
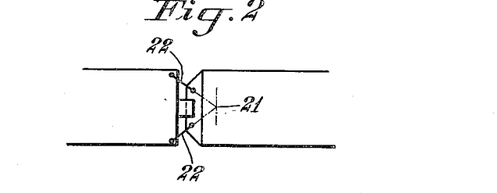
Fig. 2 shows a coupling arrangement between the vehicles.

According to Fig. 1, the locomotive set comprises two vehicles, i. e., a vehicle 1 carrying the boiler 2 and the coal bunker 3, and another vehicle 4 carrying a condenser consisting of an air cooled part 5 and a liquid container 6 belonging thereto, said liquid container operating under vacuum. On this vehicle the driving set is also arranged, the same consisting in the embodiment disclosed, of a steam turbine 14 which is connected with the driving wheels 13 by means of the toothed gearing 8, the lay shaft 26 and coupling arrangements 9. The steam turbine 14 is rigidly connected with the liquid container 6. The vehicles are preferably coupled by means of a link coupling of known type, which is more fully disclosed in Fig. 2, the same consisting of links 22 arranged in such a manner as to produce an ideal pivot in the point 21. Preferably, the resiliency in the high pressure steam piping from the boiler 2 to the turbine 14 should be provided at this pivot 21. The driving wheels 13 of the locomotive are gathered in one bogie 24 which is coupled directly onto the frame 25 of the leading vehicle 1 by means of the coupling device shown in Fig. 2.

Figure 3:
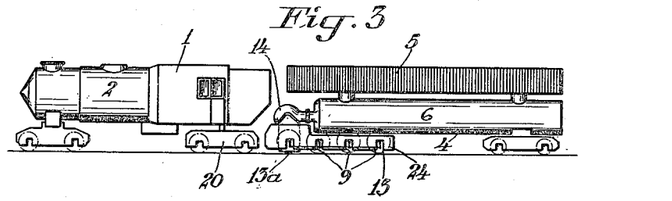
Fig. 3 shows a further embodiment of a locomotive in which an arrangement according to the invention may be provided.

In the locomotive disclosed in Fig. 3, wherein the steam turbine 14, is also rigidly connected with the condenser vessel 6, the first pair of driving wheels 13ª are driven directly from the toothed gearing, whereas the remaining pairs of driving wheels are connected with the first-mentioned pair of wheels through the medium of coupling rod arrangements 9. Thus there is no lay shaft in the locomotive shown in this figure, the driving wheel axle being formed, so to speak, by the last shaft itself of the toothed gearing. The invention may, however, be applied in this case too. The bogie 24 in which the driving wheels 13 are gathered is coupled onto the trailing bogie 20 of the front vehicle 1.

Figure 4:
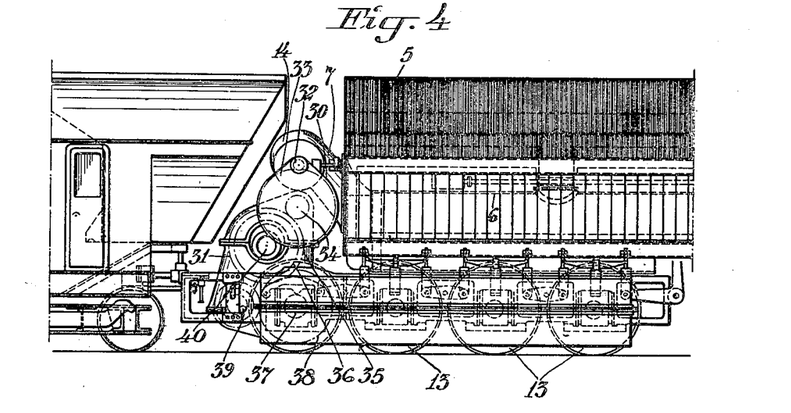
Fig. 4 discloses on a larger scale a driving means according to the invention, as adapted for the locomotive shown in Fig. 3.
Figure 5:
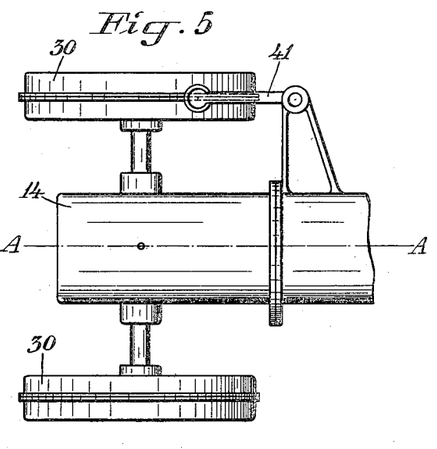
Fig. 5 is a diagrammatic representation of a detail of this arrangement viewed from above.

In the locomotives shown in Figs. 1 and 3, the bogie 24 should evidently be movable with respect to the condenser vessel 6 or to the frame thereof, and consequently also with respect to the driving motor 14, in order to facilitate the turning movement produced when the locomotive is running through curves. This will appear more readily from Figs. 4 and 5.

According to these figures, the steam turbine 14 is disposed between the two movable casings 30 and above a gear casing 31 containing the shafts, pinions and gear wheels, partly for reduction of the speed of the turbine, and partly to obtain reversal of the running direction. In the toothed gearing, which is symmetrical in relation to the center line A—A in Fig. 5, the first pair of pinions and toothed wheels are arranged in such a manner within the gear casings 30 that the first pinion 32 is movably adjustable on the larger gear wheel 33. Arranged on the same shaft as the toothed wheel 33 is a pinion 34 located within the gear casing 31. The said pinion 34 drives a toothed wheel 35 mounted on the same shaft as a pinion 36, which latter drives the toothed wheel 38 mounted about the first driving wheel axle 37. To effect reversal, additional gear wheels are arranged on the shaft 39, which is eccentrically mounted, the said additional gear wheels being thus adapted to be moved into and out of engagement with the toothed wheels 35 and 38. The shaft 40 carrying the pinion 36 and the toothed wheel 35 is also mounted eccentrically, and may thus be brought out of engagement with the toothed wheel 38. The casings 30 are kept in position by pendulums 41 which are rigidly connected with the condenser vessel (see Figs. 5, 7 and 8) and may adjust themselves in known manner so that the pinion 32 will obtain a uniform engagement with the toothed wheel 33. This movement of the casings 30 and the pinion 32 is permitted according to the invention by the pinion 32 being connected with the shaft of the turbine by means of diaphragm couplings, as will appear more fully from Fig. 6.

Figure 6:
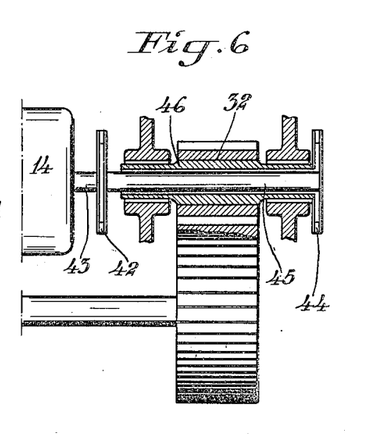
Fig. 6 shows diagrammatically another detail of the driving means disclosed in Fig. 4.

According to this figure, the turbine 14 is connected with the first pinion 32 through the medium of two diaphragms 42 and 44. The first diaphragm 42 connects the turbine shaft 43 with a shaft 45 extending through the hollow shaft 46 of the pinion 32, said shaft 45 being connected at its other end with the shaft 46 by means of the diaphragm 44. By suitably dimensioning the plays and diaphragms the pinion 32 is permitted to make sufficient deflections in all directions with respect to the turbine shaft 43. The other end of the turbine shaft is connected in the same manner with the pinion 32 situated symmetrically on the other side. The gear casing 31 is mounted on the frame of the bogie, so that the said casing may, together with the casing 30, follow the movements of the bogie in relation to the turbine and the condenser vessel.

Figure 7:
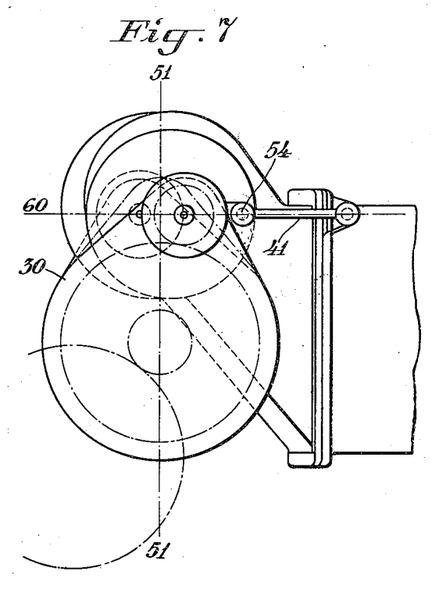
Figs. 7 and 8 show a portion of this driving means viewed from the side and from above respectively.
Figure 8:
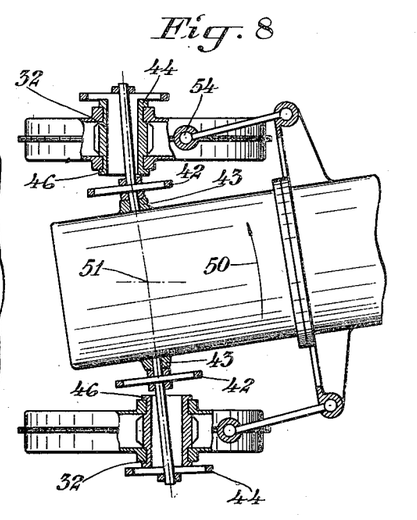

Figs. 7 and 8 shows a position of the driving means with respect to the bogie when the latter is turned from its normal position in the vehicle passing through a curve. In these figures it is assumed that the condenser vessel and the turbine rigidly connected therewith have turned with respect to the bogie, such turning having taken place in the direction of the arrow 50 in Fig. 8. By coupling the bogie with the condenser vessel or the frame thereof in a way hereinbefore described regarding the coupling of the two vehicles, a turning movement between the bogie and the vessel or the frame respectively may be enforced about a definite axis of rotation which is denoted in the figures by 51. When the turbine, together with the shaft 43 thereof, turns with respect to the bogie and the toothed gearing mounted thereon, the necessary flexibility between the turbine shaft 43 and the shaft 46 of the toothed gearing is brought about, according to the invention, by resiliency of the diaphragms 42 and 44 described hereinbefore this being possible by the axis of rotation 51 being arranged in the middle point of the axis of the turbine shaft, whereby the angular displacement of the diaphragm involved by the turning movements of the bogie will be the least possible.

Figures 9, 10, 11, 12:
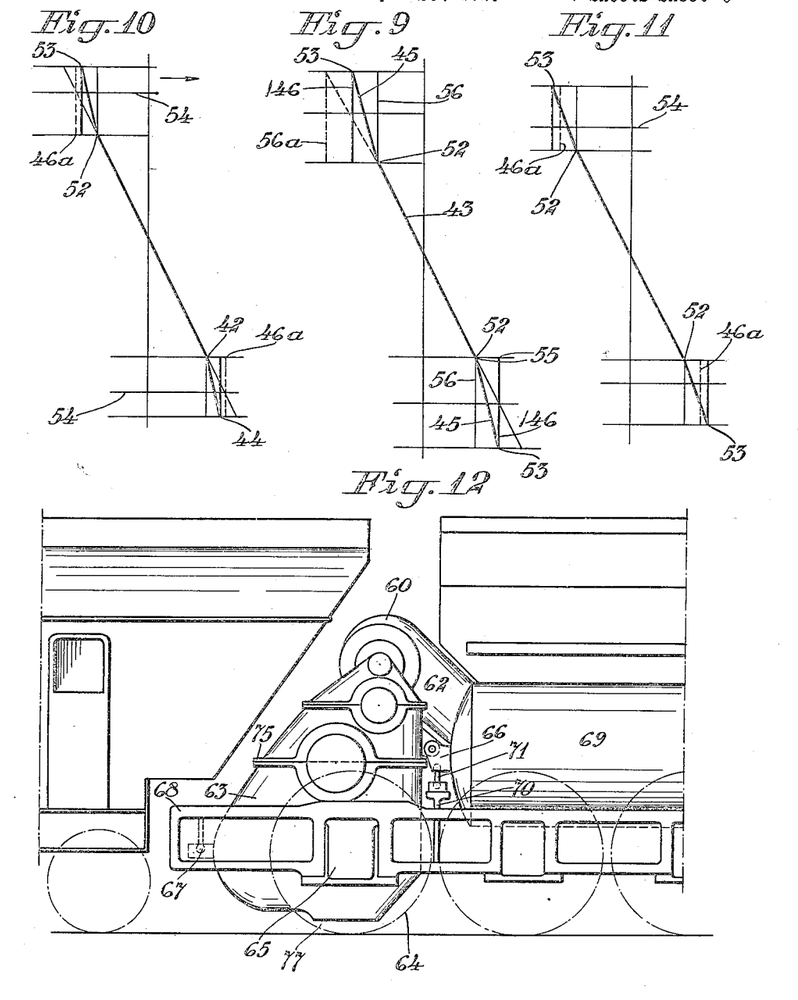
Figs. 9, 10 and 11 show diagrammatically the first shaft of the toothed gearing in different positions.
Figs. 12 and 13 show a further embodiment of the invention in side and plan views respectively.

Fig. 9 shows diagrammatically the alterations of the position brought about for the different shafts, the turning movement being shown somewhat exaggerated, for the sake of clearness. 43 designates the turbine shaft after turning, and the line 146 denotes the position of the shaft center of the toothed gearing 32, whereas the line 45 denotes the center line of the shaft extending through the hollow shaft 46. The diaphragms are situated in the points 52 and 53. It is desirable that the two diaphragms obtain the same bulging and, consequently, the same stresses, which is attained most suitably by the angular displacements of the casings 30 being determined by the pendulums 41. If these pendulums were not provided, the shaft 146 would assume one of the two extreme positions 56 and 56ª corresponding to a maximum deflection of only one of the diaphragms which would thus be subjected to an excessive strain, the same having to take up alone not only the deflection calculated for both diaphragms but also the pressure produced by the pinion driving the toothed wheel co-operating therewith. By means of the pendulums 41, the movable casings 30 are compelled to assume such a position 146 between the two extreme positions 56 and 56ª as to cause the angular displacements of the diaphragms to be the same, that is to say the requisite resiliency is distributed uniformly on the two diaphragms.

Fig. 10 shows the positions of the various shafts in case the diaphragms 42 and 44 cannot, as in Fig. 9, be disposed at the same distance from the points 54 at which the pendulums 41 act. If the line 54 designates the axis of the pendulum 41, it will be seen that the diaphragm 42 situated at 52 is farther off from this axis than the diaphragm 44 situated at 53. If the same arrangement were used, as shown in Fig. 9, the shaft 46 would be turned by the pendulum 41 to the position 46ª. In this position 46ª, the bulging of the two diaphragms will not be the same, the diaphragm situated at 53 being in such case actuated more than the diaphragm situated at 52, which is disadvantageous. If the point 54 at which the pendulum 41 acts is disposed above the center line 60, Fig. 7, the angular deflection of the casing 30 obtained by means of the pendulum 41 will be reduced. According to Fig. 11, an increased deflection of the casing 30 may be obtained in the same way by the point 54 being located below the line 60. Thus the original of force 54 has to lie on line 60 when this origin of force is situated at the same distance from the two diaphragms (Fig. 9), whereas the origin of force 54 should be located above the line 60 in cases where the inner diaphragm is situated farther off from the point 54 than the outer diaphragm (Fig. 10), and below the line 60 when conditions are reversed (Fig. 11).

Figure 13:
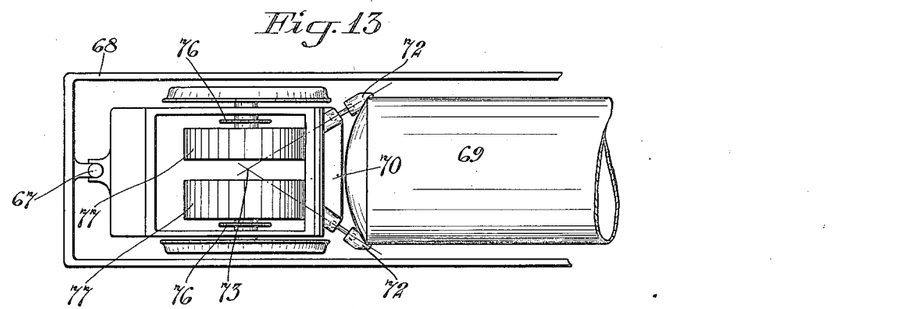

In Figs. 12 and 13, a further embodiment of the invention is shown. Fig. 12 discloses the driving set with the turbine 60, the outlet 62, the casing 63 containing the toothed gearing, and the driving wheels 64, which latter are interconnected by means of coupling rods, cranks etc. not shown in the drawings. In this case the toothed gearing is entirely enclosed in the casing 63, the movable casings 30 described hereinbefore being therefore omitted. In this case the gear casing 63 and the turbine 60 are both rigidly connected with the condenser or the frame thereof, while being movably arranged with respect to the bogie, in that the necessary resilient or flexible connection is provided about the driving axle 65. The casing 63 is suspended on the condenser vessel as at 66, for instance by means of eyelets and bolts, so as to follow the movements of the vessel, the said casing being also suspended on the bogie frame 68 by means of a pendulum 67. The condenser vessel 69 is placed on the frame 68 of the bogie, or on a part 70 belonging thereto, by means of spherical pendulums 71. The bogie being thus directly connected with the condenser vessel 69 and the casing 63, or with the frame belonging thereto, only through the medium of pendulums, the said bogie will be movable in all directions with respect to said other parts. By the pendulums 72 shown in Fig. 13, said pendulums connecting the frame 68 of the bogie or the part 70 belonging thereto with the condenser frame, the movement of the bogie frame 68 may be limited to a turning movement about a definite axis of rotation 73 in the center of the axis of rotation of the first driving wheel. These pendulums 72 are located for example one below each of the eyelets 66 and the pendulums 71. By this pendulum suspension gear the bogie will be movable about the point 73 with respect to the condenser vessel or frame respectively, the steam motor and the gear casing. From Fig. 13, where the portion of the gear casing otherwise situated above the flange 75 has been removed, it will be seen how the flexibility of the gear casing required according to the principle of the invention is obtained by means of diaphragms 76. These diaphragms permit movement of the bogie and the driving wheels in relation to the axis of the toothed wheels 77 and, consequently, also in relation to the whole gear casing and other parts rigidly connected therewith.

Figure 14:
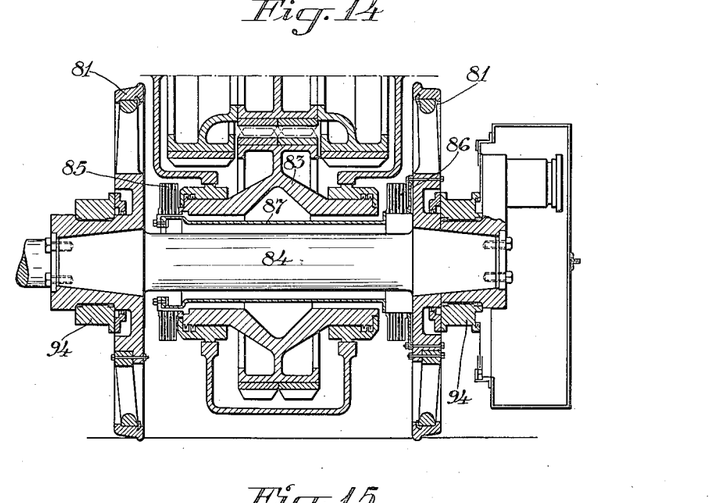
Fig. 14 shows a portion of the driving means in this embodiment.

Fig. 14 shows an embodiment of these diaphragms. In this figure, 83 designates the shaft of the last toothed wheel in the gearing, said shaft being in known manner connected with a sleeve 87 by means of the diaphragm 85, said sleeve extending through the shaft 83 and being connected at its other end with the driving wheel 81 by means of another diaphragm 86. The axle 84 of the driving wheel 81 extends through the sleeve 87 and the shaft 83 disposed thereabout, and will thus obtain its movement through the medium of the two diaphragms in such a manner that the axle 84 is permitted to assume comparatively great angular positions with respect to the shaft 83 and, consequently, with respect to the whole of the remaining toothed gearing and vehicle. The driving axle 84, which is mounted in bearings 94 provided in the bogie frame, will thus be capable of assuming such oblique positions with respect to the toothed gearing as are produced by the turning of the bogie in relation to the vehicle carried thereby. These diaphragms 85 and 86 are thus adapted to facilitate, by their resiliency, partly the flexibility of the toothed gearing with respect to the axle 84, and partly the movement of the bogie in a lateral direction with respect to the toothed gearing, which is rendered possible by suitably dimensioning the diaphragms and the plays.

Figure 15:
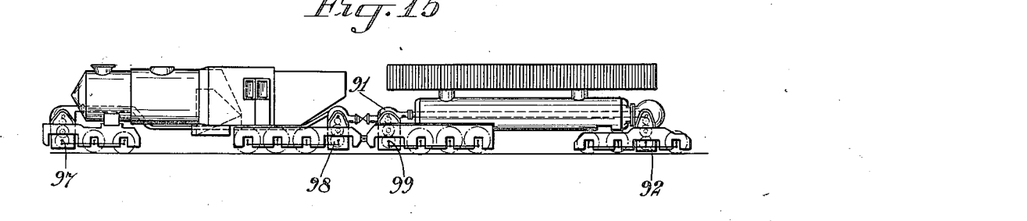
Fig. 15 shows a still further embodiment of a locomotive in which the invention may be applied.

Fig. 15 shows a locomotive provided with driving means mounted on both vehicles. In relevant parts the embodiments hereinbefore described may be used to facilitate the rigid arrangement of the driving means on the frames, and the movability of the bogies with respect to the same. The invention may be applied directly in the driving means 91 and 92. Analogous arrangements may also be provided in the driving sets 97 and 98, in case it is desired to rigidly connect the driving motor with the frame on which the boiler is mounted. In the locomotive shown in this figure, the power is transmitted from the toothed gearing onto the driving wheels by means of a lay shaft 99. As already mentioned, the invention is independent of whether a lay shaft is provided or not, and the same arrangements and diaphragms as have been described in the foregoing may also be provided in this embodiment, if only the driving wheels are conceived as removed from the last shaft of the toothed gearing.

Figure 16:
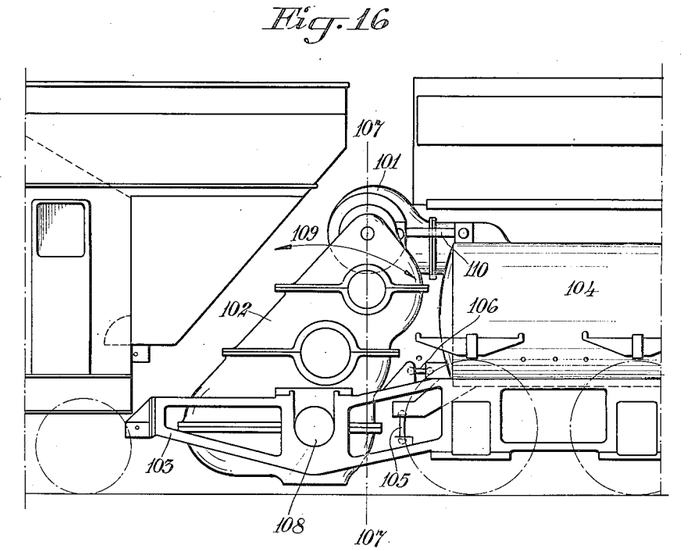
Figs. 16 and 17 represent a still further embodiment of the invention in side and plan views respectively.
Figure 17:
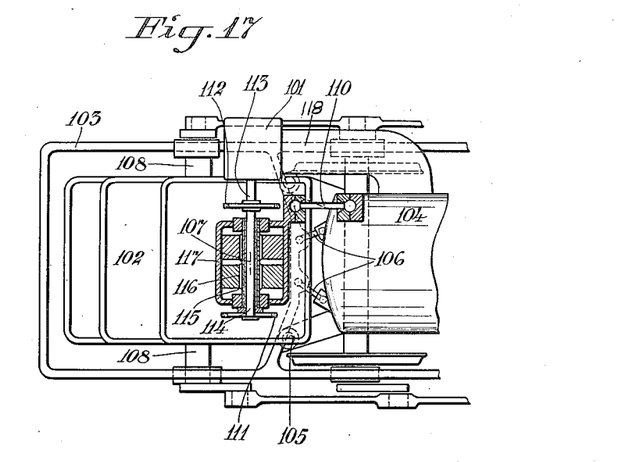

In the embodiment disclosed in Figs. 16 and 17, 101 designates the driving motor of the locomotive, said motor consisting in the present case of a turbine, and 102 is a casing enclosing the mechanical power transmitting means. 103 is a bogie carrying the condenser frame consisting in the present case of the vessel 104, in that the said vessel is supported on the bogie by means of a spherical pendulum 105, whereby the bogie will be movable in all directions with respect to the condenser. By means of pendulums 106 connecting the frame of the condenser with the frame of the bogie, an ideal axis of rotation may be obtained between the bogie and the condenser or the frame of the latter, on the line 107—107.

It will be seen from Fig. 17 that the shaft 108 of the gearing which rotates at the lowest rate of speed is not provided with driving wheels, but with cranks from which the motion is transmitted onto the driving wheels by means of coupling rods. According to the invention, the gear casing 102 is mounted so as to be movable about the lay shaft 108 in such a manner that it may move in the plane of the paper in the direction of the arrow 109 in Fig. 16, provided the casing is disconnected from the steam motor and other parts belonging thereto. In order to limit the movement of the casing in the direction of the arrow 109, the said casing is secured according to the invention by means of a pendulum 110 connecting the casing with the condenser vessel 104, as shown. When the locomotive is running in curves, the bogie will thus turn with respect to the condenser vessel 104 and the steam motor 101, about the line 107—107, which turning in relation to the steam motor is permitted by the diaphragms 111 and 112. The diaphragms are arranged in known manner, the diaphragm 112 being connected on the one side with the turbine shaft 113 and on the other side with a shaft 114 extending through the hollow shaft 115, while the diaphragm 111 is connected with the two last-mentioned shafts 114 and 115. The shaft 115 carries the first driving wheels 116 of the gearing, said wheels engaging with the toothed wheels 117.

Figure 18:
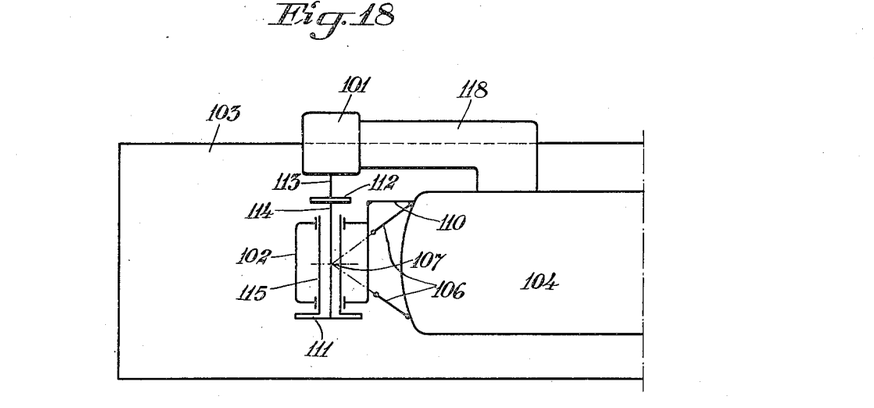
Figs. 18, 19 and 20 show diagrammatically the driving means disclosed in Figs. 16 and 17, the bogie occupying different positions with respect to the vehicle proper.
Figure 19:
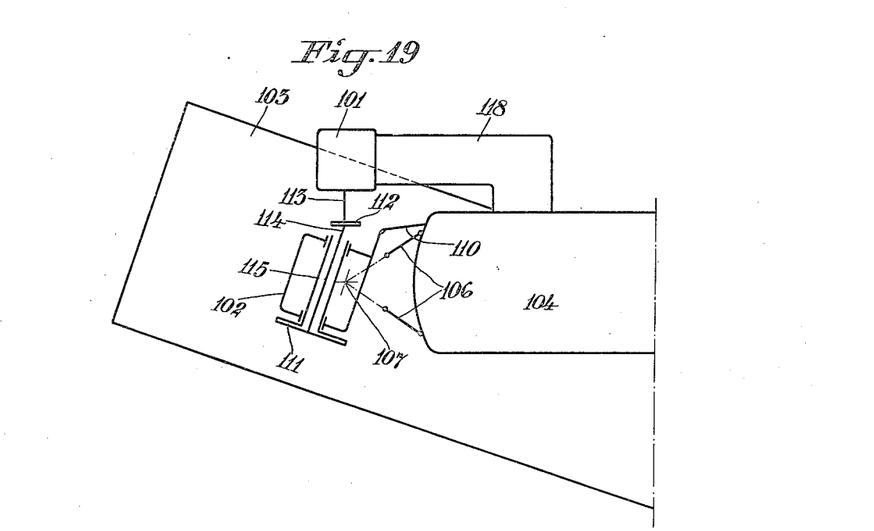
Figure 20:
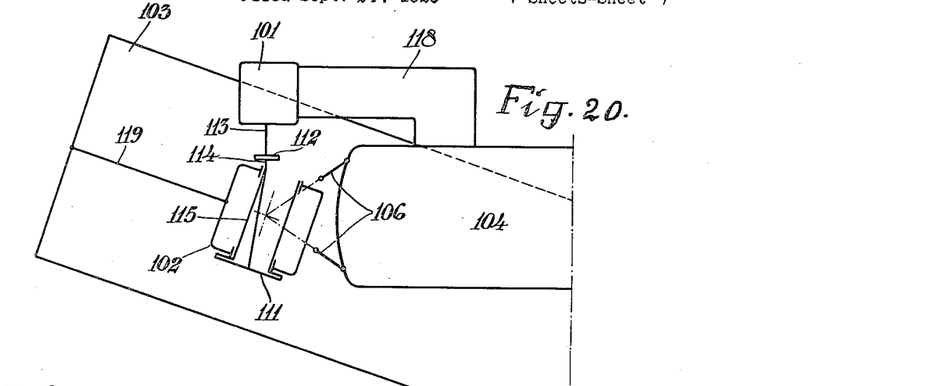

With reference to the Figures 18, 19 and 20, the arrangement disclosed in Fig. 16 is shown diagrammatically in different positions of the bogie. In these figures, 103, as before, denotes the frame of the bogie, while 101 is the driving steam motor or turbine respectively, and 104 the condenser vessel. The center line of the turbine shaft is designated by 113, and the two diaphragms by 111 and 112. The turbine 101 is rigidly connected with the condenser vessel 104 by means of the steam outlet 118 of the turbine. Fig. 18 shows the position of the bogie when the locomotive is running on a straight line, that is to say when the bogie has not turned from its normal position.

In an oblique position of the bogie 103 with respect to the steam motor 101 and the condenser vessel 104, as shown in Fig. 19 on a somewhat exaggerated scale, the shaft 114 will be moved from the axis of rotation 107 by means of the pendulum 110, in order that the play between the hollow shaft 115 and the shaft 114 extending therethrough may be kept as small as possible. This displacement is attained by the gear casing 102 being connected with the condenser vessel or with the frame pertaining thereto by means of a pendulum 110 arranged in the proximity of the diaphragm 112. If this pendulum did not connect the gear casing 102 with the condenser vessel 104 or with the frame of the latter, but did instead connect the casing for instance with the frame 103 of the bogie, as shown at 119 in Fig. 20, it would be necessary to increase the play between the shafts 114 and 115, as will appear from a comparison between the Figures 19 and 20, in which figures the bogie has been angularly displaced to the same degree. With so great an oblique position of the bogie in relation to the condenser frame, a still greater play than shown in Figs. 18–20 would be necessary, no regard having been paid in these figures to the space required owing to the thickness of the shafts.

The diaphragm arranged in the manner above described also have for their purpose to obviate forces that are injurious to the steam turbine and the toothed gearing, and to this end a play will be required also between the said shafts. If the pendulum 110 be arranged so as to be directed toward the diaphragm 112, as shown in Fig. 18, the casing 102 will be displaced, according to Fig. 19, in such a manner that the diaphragm 112 alone takes up the whole resiliency. If the pendulum 110 be displaced for instance in parallel to itself toward the center of the locomotive, the displacement of the casing 102 from the position 107 will be reduced, the deflection of the diaphragm 112 being in such case reduced while that of the diaphragm 111 is increased. By suitably positioned the pendulum 110 the value of the strains of resiliency and the play between the shafts may be fixed beforehand in the most suitable way. Conditions will of course be the same on an oblique position of the bogie in the other direction when the pendulum 110 moves the casing 102 into closer proximity to the vessel 104.

Figure 21:
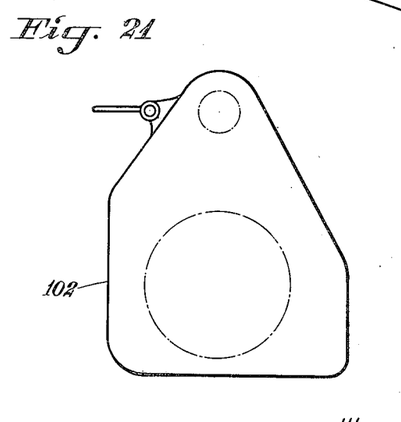
Figs. 21 and 22 represent detail arrangements of this driving means.
Figure 22:
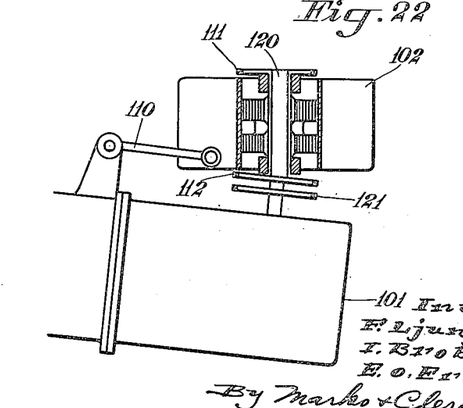

Figs. 21 and 22 show diagrammatically how the shaft 120 of the casing 102 rotating at the highest rate of speed is connected with the turbine 101 by means of a diaphragm 121, in addition to the diaphragms 111 and 112 as above described. In this case the casing 102 assumes an oblique position relatively to the turbine, such position being produced by the bogie passing through curves. In a construction according to Fig. 22, it may be conceived that the various strains of resiliency are distributed to the diaphragms in such manner that the diaphragms 111 and 112 absorb substantially the resiliency required for the oblique position of the bogie, while the diaphragm 121 principally takes up the resiliency required for the removal of injurious forces. The values of the different resiliencies and deflections may be fixed beforehand, the same being dependent on the position of the pendulum 110.

The resiliency required in the toothed gearing may also be brought about by diaphragms arranged on other shafts than the first and last ones. Likewise, movable gear casings may be employed for the sole purpose of obtaining a uniform tooth pressure, the requisite flexibility of the gearing being effected for example by diaphragms provided on the last shaft. Cases may also be conceived where one half part of the deflection of the bogie is taken up for instance by diaphragms provided on the said last shaft, while the other half part of the deflection is absorbed by movable gear casings in connection with resilient diaphragms provided on the shaft of the steam motor.

Embodiments are also conceivable in which resilient members other than diaphragms are being used, in order to attain the desired flexibility. Likewise, other devices such as link couplings or the like may be used to solve the same problem, without the scope of the invention being exceeded thereby.

What we claim as new and desire to secure by Letters Patent of the United States of America is:—

1. In a locomotive, a boiler, a steam motor, a condenser, the steam motor being rigidly connected with said condenser, a driving bogie, mechanical means for transmitting the power from the steam motor onto the wheels of the driving bogie, and means for movably connecting the steam motor with the bogie.

2. In a locomotive, a boiler, a steam motor, a condenser, the steam motor being rigidly connected with said condenser, a driving bogie, mechanical means for transmitting the power from the steam motor onto the wheels of the bogie and means for movably connecting the steam motor with the bogie, said last-mentioned means consisting of a resilient device provided in the power transmitting means.

3. In a locomotive, a boiler, a steam motor, a condenser, the steam motor being rigidly connected with said condenser, a driving bogie, mechanical means for transmitting the power from the steam motor onto the wheels of the driving bogie, means for movably connecting the steam motor with the bogie and means for supporting the frame of the condenser on the bogie so as to permit said frame to turn about a definite axis.

4. In a locomotive, a boiler, a steam motor, a condenser, the steam motor being rigidly connected with said condenser, a driving bogie, a toothed gearing for transmitting the power from the steam motor onto the wheels of the bogie and rigidly connected with said bogie, and means for movably connecting the steam motor with said gearing.

5. In a locomotive, a boiler, a steam motor, a condenser, the steam motor being rigidly connected with said condenser, a driving bogie, a toothed gearing for transmitting the power from the steam motor onto the wheels of the bogie, said toothed gearing being rigidly connected with the steam motor, and means for movably connecting the toothed gearing with the bogie so as to permit a turning movement about a geometrical axis crossing the gearing.

6. In a locomotive, a boiler, a steam motor, a condenser the steam motor being rigidly connected with said condenser, a driving bogie, a toothed gearing for transmitting the power from the steam motor onto the wheels of the bogie, said toothed gearing being rigidly connected with the steam motor, and means for movably connecting the toothed gearing with the bogie, so as to permit a turning movement about a geometrical axis crossing the gearing, said means consisting of diaphragm couplings which are arranged around the shaft of the gearing rotating at the lowest rate of speed and connect the gearing with driving means arranged on the bogie.

7. In a locomotive, a boiler, a steam motor, a condenser, the steam motor being rigidly connected with said condenser, a driving bogie, a toothed gearing for transmitting the power from the steam motor onto the wheels of the bogie, a casing in which the shafts of the gears of said gearing are mounted and which is swingably mounted about the gear shaft rotating at the lowest rate of speed, and a stay pendulum connecting said casing with the frame of the locomotive.

8. In a locomotive, a boiler, a steam motor, a condenser, the steam motor being rigidly connected with said condenser, a driving bogie, a toothed gearing for transmitting the power from the steam motor onto the wheels of the bogie, a casing in which the shafts of the gears of said gearing are mounted and which is swingably mounted about the gear shaft rotating at the lowest rate of speed, and a stay pendulum connecting said casing with the frame of the condenser.

9. In a locomotive, a boiler, a steam motor, a condenser, the steam motor being rigidly connected with said condenser, a driving bogie, a toothed gearing for transmitting the power from the steam motor onto the wheels of the bogie, a casing in which the shafts of the gears of said gearing are mounted and which is swingably mounted about the gear shaft rotating at the lowest rate of speed and situated laterally of the steam motor, the gear shaft rotating at the highest rate of speed being connected with the motor shaft by means of a diaphragm coupling, and a stay pendulum connecting said casing with the frame of the locomotive.

10. In a locomotive, a boiler, a steam motor, a condenser the steam motor being rigidly connected with said condenser a driving bogie, a toothed gearing for transmitting the power from the steam motor onto the wheels of the bogie, a casing in which the shafts of the gears of said gearing are mounted and which is swingably mounted about the gear shaft rotating at the lowest rate of speed and situated laterally of the steam motor, the gear shaft rotating at the highest rate of speed being connected with the motor shaft by means of a diaphragm coupling, and a stay pendulum connecting said casing with the frame of the locomotive and extending in the direction towards that part of the diaphragm coupling located between the steam motor and the gear casing.

In testimony whereof we affix our signatures in presence of two witnesses.

FREDRIK LJUNGSTRÖM.
ISIDOR BROBERG.
ERIK OTTO ERIKSSON.

Witnesses:
KARL RUNCSKOF,
H. L. KJELLBERG.